United States Patent [19]
Kawasaki

[11] Patent Number: 5,716,574
[45] Date of Patent: Feb. 10, 1998

[54] PROCESS FOR THE PRODUCTION OF POWER CABLE

[75] Inventor: Youichi Kawasaki, Kanagawa-ken, Japan

[73] Assignee: Nippon Unicar Company Limited, Tokyo, Japan

[21] Appl. No.: 637,329

[22] Filed: Apr. 23, 1996

[30] Foreign Application Priority Data

Apr. 25, 1995 [JP] Japan ..................... 7-124371

[51] Int. Cl.⁶ ............................................... B29C 47/02
[52] U.S. Cl. ........................... 264/171.17; 264/171.19; 264/236; 264/347; 425/97; 425/113
[58] Field of Search ................ 264/171.17, 171.14, 264/171.15, 171.19, 236, 347; 425/97, 94, 113, 114

[56] References Cited

U.S. PATENT DOCUMENTS

| | | | |
|---|---|---|---|
| 3,054,142 | 9/1962 | Hinderer et al. | 264/171.15 |
| 3,591,674 | 7/1971 | Engel | 264/236 |
| 3,859,247 | 1/1975 | MacKenzie, Jr. | 264/236 |
| 4,001,368 | 1/1977 | Michizoe et al. | 264/209.6 |
| 4,091,064 | 5/1978 | Kakinuma et al. | 264/171.17 |
| 4,234,531 | 11/1980 | Jocteur | 425/97 |
| 4,250,132 | 2/1981 | Beach | 264/171.19 |
| 4,289,716 | 9/1981 | Voigt | 264/209.6 |
| 4,520,230 | 5/1985 | Uesugi et al. | 174/107 |
| 4,588,855 | 5/1986 | Kutsuwa et al. | 174/120 SC |

OTHER PUBLICATIONS

Progress in Technology, etc., Fukuda et al, reprinted from Furukawa Review, No. 5, 1987.
XLPE-extruder MPW Brochure, Nokia–Maillefer (No date).

*Primary Examiner*—Jeffery R. Thurlow
*Attorney, Agent, or Firm*—Saul R. Bresch

[57] ABSTRACT

A process for the co-extrusion of an outer layer, a middle layer, and an inner layer, each layer including a thermoplastic resin, around a conductive medium in three extruders, one extruder for each layer, connected by a triple crosshead, each of said extruders having an extrusion zone comprising a die plate and, downstream of the die plate, a die, and, downstream of the extrusion zone, a common crosslinking zone, comprising passing the thermoplastic resins through the extrusion zones, under extrusion conditions including an extrusion temperature in the range of at least 150 degrees C. to below the decomposition temperature of the organic peroxide referred to hereinafter, and passing the extrudate into the crosslinking zone, under crosslinking conditions, the improvement comprising introducing an organic peroxide having a half life of one minute at a temperature of about 150 to about 200 degrees C. into the middle layer extruder downstream of the die plate and prior to the point about directly beneath the die plate of the outer layer extruder.

10 Claims, 4 Drawing Sheets

PROCESS FOR THE PRODUCTION OF POWER CABLE

TECHNICAL FIELD

This invention relates to a process for the production of a crosslinked polyethylene insulated power cable, which can be used for the transmission of electric power ranging from low voltage (about 6 kilovolts) to high voltage (about 500 kilovolts or over).

BACKGROUND INFORMATION

Power cables are broadly classified under OF cables (oil impregnated, paper insulated cables) and CV cables (crosslinked polyethylene insulated, polyvinyl chloride coated cables). Since the OF cables are relatively more expensive in terms of space for installation, maintenance, and measures to prevent the oil from catching fire, CV cables have come to take the place of the OF cables in recent years.

A typical CV cable is a power cable which is produced by coating a conductor through the medium of an inner semi-conductive layer with an insulating layer of polyethylene exhibiting excellent dielectric strength and enjoying a low dielectric constant and dielectric loss; crosslinking the polyethylene; and covering this insulating layer with either an outer semiconductive layer or a sheathing layer. Since the CV cable is insulated with a solid layer, the necessity for an oil supply device is obviated as well as measures to protect the oil from fire, and relatively easy installation and maintenance are permitted. The crosslinked polyethylene which is used in the insulating layer improves the cable's resistance to heat, mechanical strength, and resistance to dielectric breakdown.

Heretofore, crosslinked polyethylene insulated power cables have been produced by various methods. Typically, a power cable was manufactured by mixing polyethylene with an organic peroxide, blending the mixture by the use of a roll mill, Henschel™ mixer, biaxial screw, kneading extruder, or Banbury™ mixer at a temperature not lower than the melting point of the polyethylene (in the case of high pressure low density polyethylene, the melting point is about 104 to 107 degrees C.) and not higher than the decomposition temperature of the organic peroxide (in the case of dicumyl peroxide, the decomposition temperature for a half life of one minute is about 171 degrees C., the decomposition temperature for a half life of 10 minutes about 148 degrees C., and the decomposition temperature for a half life of 30 minutes about 140 degrees C.) thereby obtaining an organic peroxide/polyethylene composition, supplying this composition to a crosshead extruder including an insulating layer extruding device, extruding the composition around a conductor, and crosslinking the composition.

By this method, however, the mixture in the course of the blending is subjected to local mechanical shear strength and a local rise in temperature. The rise in temperature results in early decomposition of the organic peroxide and induces local scorch (premature crosslinking). Scorch is particularly serious in the middle insulating layer, which is generally thicker than the inner and outer layers of the power cable. The mechanical shear strength produces local gels, destroys the homogeneity of the insulating layer of the power cable, and deteriorates and disrupts the insulation. When the gels are present in the crosslinked polyethylene composition, they give rise to minute bumps in the interface between the semiconductive layer and the insulating layer. The so-called electric trees and water trees issue from these bumps causing a decrease in the service life of the power cable, and inevitably compelling a reduction in its continuous operating time. Further, the presence of the gel portion inevitably results in lowering the speed at which the insulating layer can be extruded.

In order to cure the problems caused by local mechanical shear strength and local temperature rise, numerous methods have been proposed. A typical solution to these problems entails adding an organic peroxide to a powdery or granular polyethylene resin, stirring the mixture at a temperature of not higher than the melting point of the resin and not lower than the melting point of the organic peroxide in such a manner as to avoid exerting on the organic peroxide a thermal hysteresis capable of inducing decomposition.

In the resin composition which is produced by this method, however, the organic peroxide is not dispersed uniformly in the polyethylene resin. Though the polyethylene resin and the organic peroxide are kneaded with a screw at a temperature in the range of 120 to 140 degrees C. within the insulating layer extruding device during the production of the power cable, the problem of early crosslinking of the polyethylene cannot be precluded.

Since the power cable will be exposed to high voltage, minute extraneous particles such as metal, inorganic oxides, salts, and polar organic substances, when permitted to be present in the power cable tend to cause deterioration, disrupt the insulation, and shorten the service life of the power cable. The insulating layer extruding device, therefore, is provided with a screen pack of not less than 500 mesh for the purpose of removing extraneous particles (impurities) exceeding 50 microns in diameter. When the gel portion due to the early crosslinking grows, however, it still clogs the screen pack, hindering the passage of the molten polyethylene, and degrading the efficiency of the process. Further, the polyethylene insulating layer generally includes an antioxidant for the sake of protection against thermal deterioration. Most antioxidants have melting points exceeding 150 degrees C. Thus, the antioxidant also cannot be uniformly dispersed in the polyethylene at low temperatures.

DISCLOSURE OF THE INVENTION

An object of this invention is to provide a process for the production of a crosslinked polyethylene insulated power cable, which can be prepared at relatively high temperatures without the problem of scorch or reduced mechanical strength. Other objects and advantages will become apparent hereinafter.

According to the invention, a process has been discovered, which meets the above object.

The process is one for the co-extrusion of an outer layer, a middle layer, and an inner layer, each layer comprising a thermoplastic resin, around a conductive medium in three extruders, one extruder for each layer, connected by a triple crosshead, each of said extruders having an extrusion zone comprising a die plate and, downstream of the die plate, a die, and, downstream of the extrusion zone, a common crosslinking zone, comprising passing the thermoplastic resins through the extrusion zones, under extrusion conditions including an extrusion temperature in the range of at least 150 degrees C. to below the decomposition temperature of the organic peroxide referred to hereinafter, and passing the extrudate into the crosslinking zone, under crosslinking conditions, the improvement comprising introducing an organic peroxide having a half life of one minute at a temperature of about 150 to about 200 degrees C. into the middle layer extruder downstream of the die plate and prior to the point about directly beneath the die plate of the outer layer extruder.

DESCRIPTION OF THE PREFERRED EMBODIMENT(S)

Figure 1:
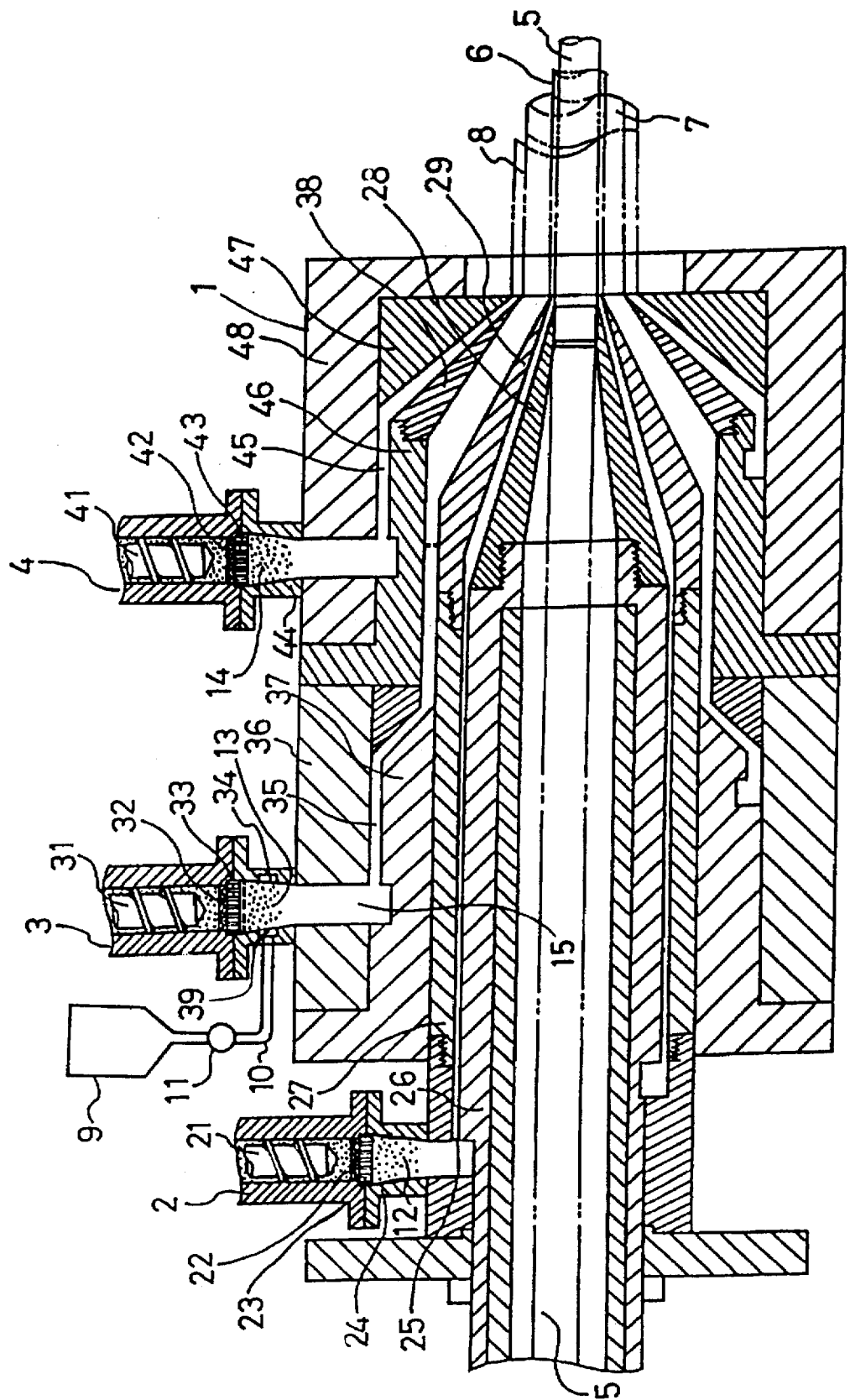
FIG. 1 is a vertical cross-sectional flew of a three-layer common extruding machine, which can be used in the process of the invention.

The three-layer common extruding machine, which can be used in the present invention has a three-layer common crosshead, and comprises an outer layer extruder, a middle layer extruder and an inner layer extruder. The outer layer is generally a semiconductive layer or a jacketing layer; the middle layer is generally an insulating layer; and the inner layer is generally a semiconductive layer. Conventional three-layer common extruding machines can be used as they are except that means for injecting an organic peroxide for the middle or insulating layer is provided at a specific location as shown, for example, in FIG. 1 of the drawing.

The means for injecting the organic peroxide is not limited as to shape or material provided that it is suitable for blending an organic peroxide into the flow of molten resin and diffusing the organic peroxide into the resin uniformly. For example, a cylindrical porous metal or a stack of several disk plates of a sintered ceramic, metal, or plastic with a slight space interposed between the plates provided on the inner wall of a cylinder below the die plate of the middle layer extruder, or a large number of rectangular plates arranged in a radial manner around the cylinder can be used. Supply of the organic peroxide to the injection means from an external tank for storing the organic peroxide maintained at an appropriate temperature is performed by means of a commonly used pump or the like.

The thermoplastic resin can be any homopolymer or copolymer produced from two or more comonomers, or a blend of two or more of these polymers, conventionally used as insulating and/or jacketing materials in wire and cable applications. The thermoplastic resin used in one layer can be the same as or different from the thermoplastic resin used in the each of the other layers. Generally, the monomers useful in the production of these homopolymers and copolymers will have 2 to 20 carbon atoms. Examples of such monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene; other monomers such as styrene, p-methyl styrene, alpha- methyl styrene, vinyl naphthalene, and similar aryl olefins; nitriles such as acrylonitrile and methacrylonitrile; vinyl methyl ketone, vinyl methyl ether, and maleic anhydride; and acrylic acid, methacrylic acid, and other similar unsaturated acids. In addition to polyolefins, included among the polymers can be polyesters, polycarbonates, and polyurethanes. The homopolymers and copolymers of ethylene are preferred. The resins are preferably non-halogenated.

Examples of homopolymers and copolymers of ethylene are high pressure, low density polyethylene; polyethylenes of various densities (high, medium, linear low, very low, and ultra-low) wherein the comonomer is 1-butene, 1-hexene, 4-methyl-1-pentene, or 1-octene; ethylene/propylene rubber; ethylene/propylene/diene monomer rubber; ethylene/ vinyl acetate copolymer; ethylene/ethyl acrylate copolymer; isobutylene/isoprene rubber and polybutene-1.

Low pressure, high density polyethylene can be referred to as HDPE; high pressure, low density polyethylene can be referred to as HP-LDPE; low pressure straight chain low density ethylene/alphaolefin copolymer can be referred to as LLDPE; and low pressure straight chain very low density ethylene/alpha-olefin copolymer can be referred to as VLDPE. The polymers can be produced using various conventional transition metal catalysts including the Ziegler-Natta catalysts and the metallocene single-site catalysts. Various resins and processes for making them are mentioned in U.S. Pat. Nos. 5,346,961 and 5,317,036.

In the present invention, the resin can be heated and headed at a temperature of 150 degrees C. to below the decomposition temperature of the organic peroxide used in the insulating layer extruder. If the temperature is below 150 degrees C., the organic peroxide will not diffuse uniformly in the resin. If the temperature is above the decomposition temperature of the organic peroxide, the organic peroxide will decompose before it is diffused uniformly in the resin, and, hence, resin uniformly mixed with the organic peroxide cannot be obtained. The preferred upper temperature limit for the extrusion is about 170 degrees C.

A screen pack of about 500 mesh or more is preferably installed just before (upstream of) the die plate in order to remove impurities as large as about 50 microns or more contained in the resin. If these impurities are permitted to remain in the resin, a tree can be generated by charging high voltage thereby causing a dielectric breakdown, and shortening the service life of the power cable in which the resin is used.

In the prior art, removal of impurities as large as 50 microns or more is generally carried out in the step of producing resin pellets. However, impurities frequently enter at the time of loading an air transport line and transport container, transporting the container, and supplying the container to the extruder at a power cable production plant. The impurities, entering after the resin pellets are produced, are removed by a screen pack provided in the extruder. Since the extruder, in accordance with the prior art, is usually operated at a low heating and heading temperature, e.g., 120 to 130 degrees C., the melt viscosity of the resin is high and the screen pack of fine mesh, namely 500 mesh or more, is easily choked with impurities when the resin is caused to pass through the screen pack. Thereby, productivity is lowered and an operating loss is caused by the premature exchange of the screen pack. In contrast to this, in the present invention, since the extruder can be operated at a higher temperature, the melt viscosity of the resin is low. Thus, there is no reduction in productivity; no necessity for the removal of impurities in producing the pellets; and no need to exchange the screen pack prematurely.

In the present invention, the organic peroxide is uniformly injected into and blended with the flow of molten resin at any desired location in the passage of the middle layer extruder from a position just after (downstream of) the die plate to a point about directly beneath the die plate of the outer layer extruder. The area of injection can also be described as injection zone 15 in FIG. 1 of the drawing. The bounds of injection zone 15 run from the dashed line adjacent to (or abutting), and on the downstream side of, die plate 33 to the dashed line about directly beneath the die plate of the outer layer extruder. Another description of injection zone 15 can be from a position adjacent to (or abutting), and on the downstream side of, die plate 33 to a point about halfway between the die plate and the die of the middle layer extruder. The injection of the organic peroxide is preferably made in close proximity to the die plate. In any case, this makes it possible to diffuse the organic peroxide uniformly into the flow of the resin, and as the result, a uniform crosslinked product is obtained. When the organic peroxide is injected into the flow of resin heated to 150 to about 170 degrees C. at a location above the die plate, scorch occurs, making it impossible to produce a high-quality power cable.

In an embodiment of the invention, the resin, uniformly blended with the organic peroxide, is caused to cover an inner semiconductive layer with an insulating layer in the die at the downstream end of the insulating layer extruder, and, further, an outer semiconductive layer is formed on the insulating layer. The resulting extrudate comprising the conductor surrounded by the three layers is further heated at about 180 to about 300 degrees C. in a common crosslinking zone, which can be a crosslinking tube or the like provided after the die and the insulating layer and other layers containing organic peroxide are crosslinked to produce a power cable. As an alternative to adding the organic peroxide to the inner and outer layer formulations prior to introduction into the respective extruders, the amount of organic peroxide added to the middle layer can be increased, and the excess organic peroxide will migrate to the inner and outer layers.

Examples of the organic peroxide whose decomposition temperature is about 150 to about 200 degrees C. until a half-life period of 1 minute is obtained include 1,1-bis-tertiary butyl peroxycyclohexane; 2,2-bis-tertiary butyl peroxybutane; tertiary butyl peroxybenzoate; dicumyl peroxide; 2,5-dimethyl-2,5-di-tertiary butyl peroxyhexane; tertiary butyl cumyl peroxide; 2,5-dimethyl-2,5-ditertiary butyl peroxyhexine-3 and the like, of which, dicumyl peroxide is preferred. The amount of the organic peroxide injected is preferably about 1 to about 5 parts by weight based on 100 parts by weight of resin.

The inner layer extruder and the outer layer extruder are usually provided on the upstream side and downstream side of the middle layer extruder, respectively. The resins and organic peroxides mentioned above can be used in these extruders as well as the middle layer extruder.

Referring to the drawing, which describes a three-layer common extruding machine useful for carrying out the process of the invention:

In FIG. 1, three-layer common crosshead 1 comprises an inner semi conductive layer extruder 2, an insulating layer extruder 3, and an outer semiconductive layer extruder 4 arranged from an upstream side (left) to a downstream side (right). The extruders have screws 21, 31, and 41 for heating and kneading supplied resins and screen packs 22, 32, and 42 above die plates 23, 33, and 43, all of which are housed in outer cylinders 24, 34, and 44, respectively.

Resins 12, 13, and 14 passing through the respective die plates are extruded from a die 29 for the inner semiconductive layer, a die 38 for the insulating layer, and a die 47 for the outer semiconductive layer through a resin passage 25 for the inner semiconductive layer, a resin passage 35 for the middle insulating layer, and a resin passage 45 for the outer semiconductive layer provided coaxially from the inside of the three-layer common crosshead 1 towards the outside, respectively. The resin passage 25 for the inner semiconductive layer is formed between a nipple holder 26, a nipple 28, and a die holder 27 for the inner semiconductive layer and continues to die 29. The resin passage 35 for the insulating layer is formed between a master core 37, the die holder 27 for the inner semi conductor layer, the die 29 for the inner semiconductive layer and core holder 36. A master core 46 for the outer semiconductive layer, the die 38 for the insulating layer, and the resin passage 45 for the outer semiconductive layer is formed between a master core 46 for the outer semiconductive layer, the die 38 for the insulating layer and a die holder 48, and the die 47 for the outer semiconducting layer.

The screen pack 32 provided in insulating layer extruder 3 is of fine mesh, about 500 mesh or more, and an organic peroxide injection unit is provided on the inner wall of outer cylinder 34 right after die plate 33 so that the organic peroxide is uniformly blended with, and diffused in, the molten resin by the injection unit. The organic peroxide is stored in an external storage tank 9 maintained at about 70 to about 80 degrees C. and fed to the organic peroxide injection unit through transport pipe 10 while the amount of organic peroxide is controlled by a high pressure quantitative transport valve 11. The organic peroxide injection unit is made up of tank 9, pipe 10, valve 11, and inner cylinder 39. The injection of organic peroxide can be made anywhere in injection zone 15, however, and the inner cylinder or other injection means can be placed anywhere in this area. The area of injection, i.e., injection zone 15, is bounded by dashed lines. One dashed line is adjacent to, and on the downstream side of, die plate 33, and the other dashed line is about directly below die plate 43 in resin passage 35.

As described above, the molten resins supplied from the respective extruders 2, 3, and 4 are simultaneously extruded around conductor 5 (see inner layer 6, middle layer 7, and outer layer 8) sent along the central axis of three-layer common crosshead 1 from the respective inner semiconductive layer die 29, insulating layer die 38, and outer semiconductive layer die 47. The resin coated conductor is then sent to a cross linking tube (not shown) to thermally crosslink the resins, thereby producing a crosslinked polyethylene insulated power cable.

Figure 2:
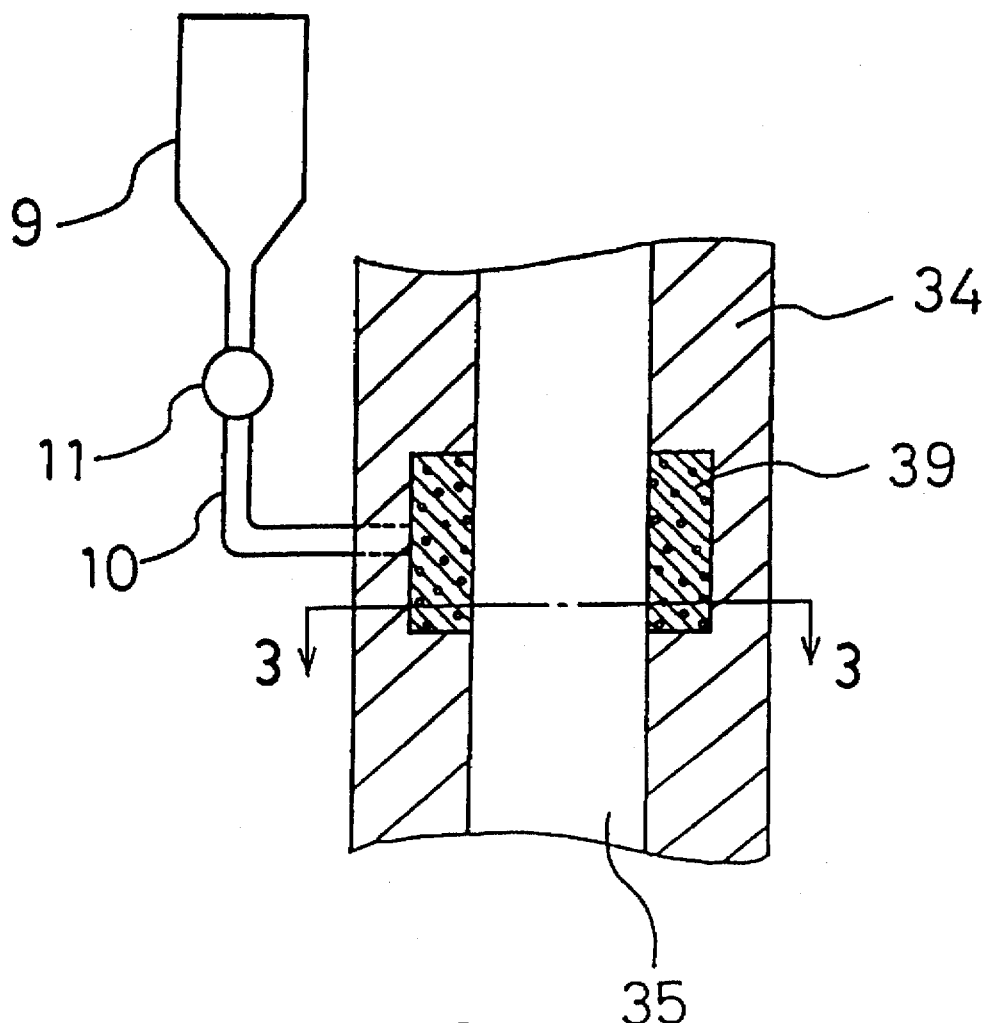
FIG. 2 is a vertical cross-sectional view of an organic peroxide injection unit including a cylinder, which can be used in the process of the invention.
Figure 3:
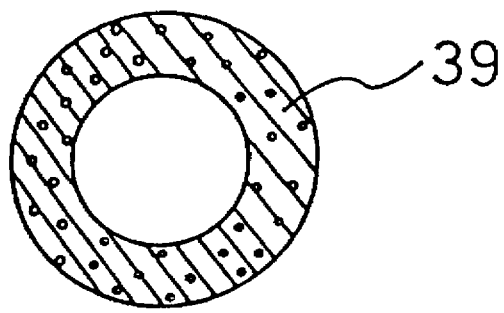
FIG. 3 is a cross-sectional plan view taken at line 3—3 of FIG. 2 showing the cylinder through which organic peroxide is injected into molten resin.
Figure 4:
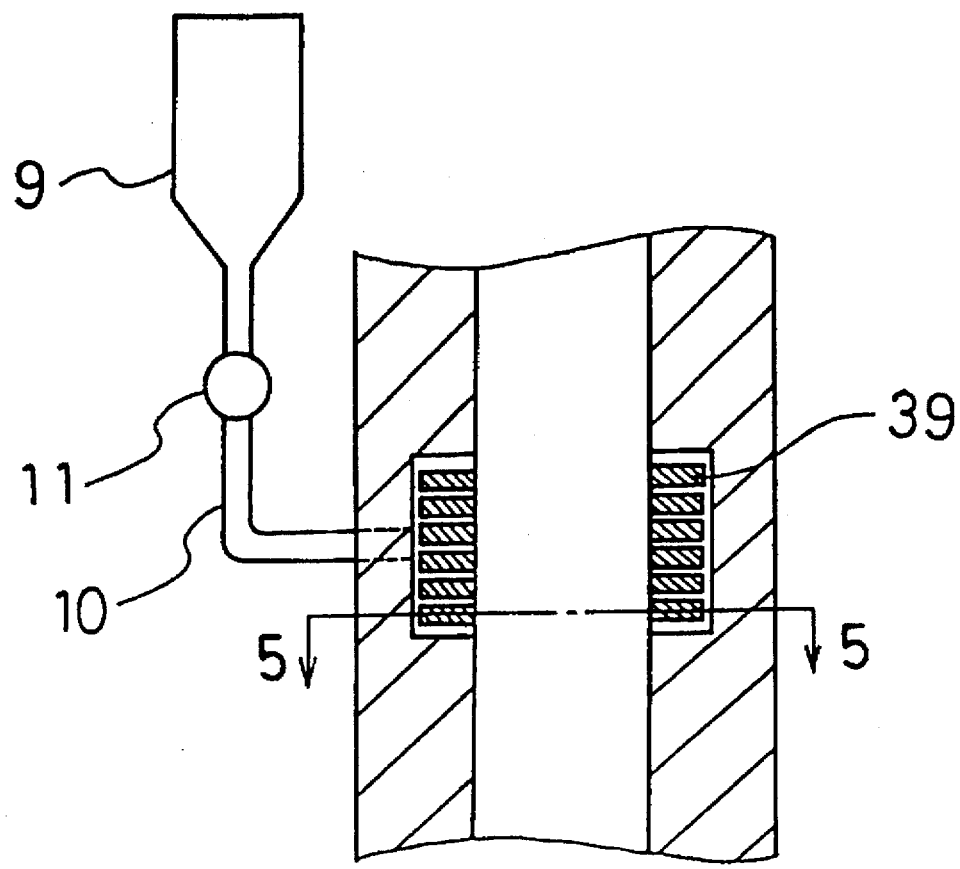
FIG. 4 is a vertical cross-sectional view of an organic peroxide injection unit including a different cylinder, which can be used in the process of the invention.
Figure 5:
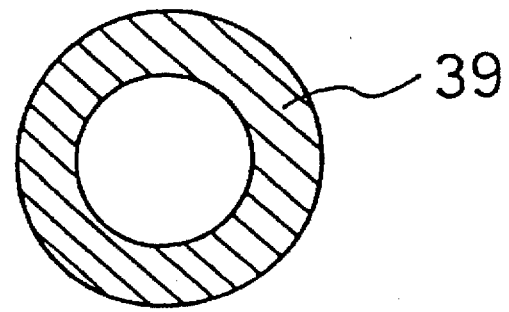
FIG. 5 is a cross-sectional plan view taken at line 5—5 of FIG. 4 showing the cylinder through which organic peroxide is injected into molten resin.
Figure 6:
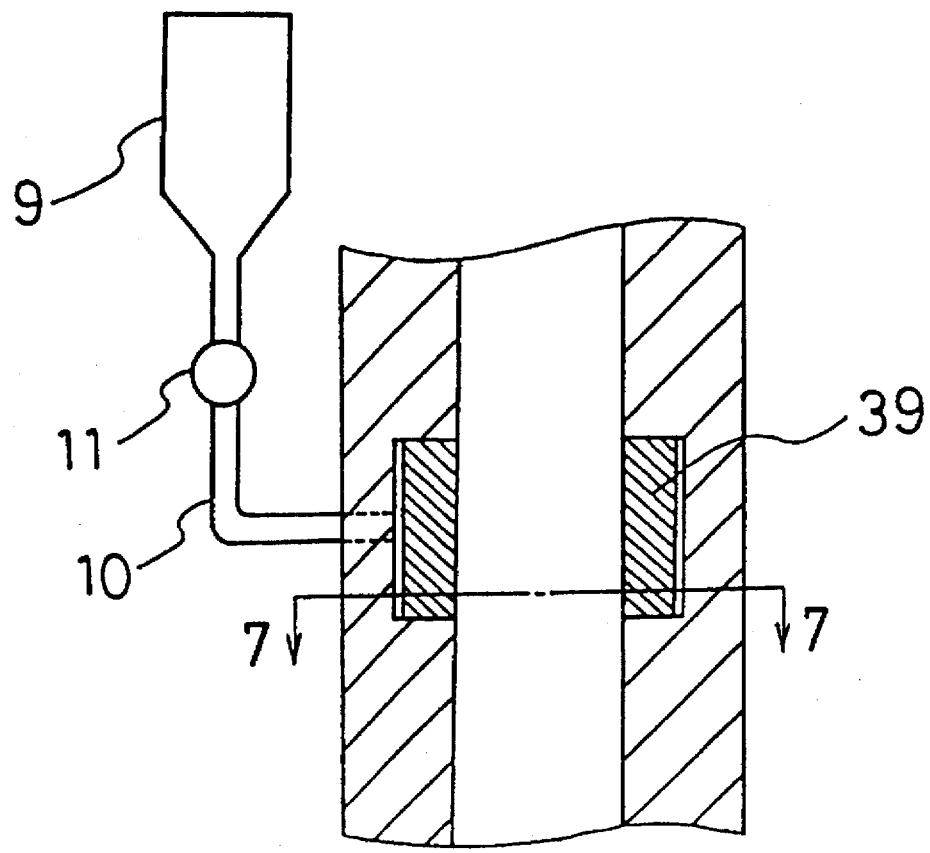
FIG. 6 is a vertical cross-sectional view of an organic peroxide injection unit including still a different cylinder, which can be used in the process of the invention.
Figure 7:
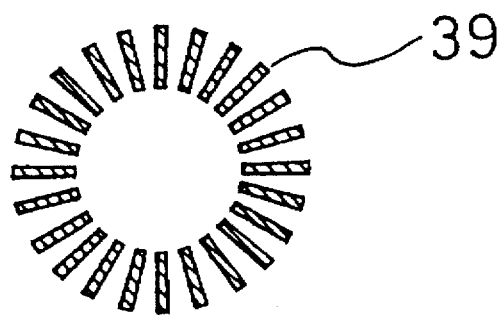
FIG. 7 is a cross-sectional plan view taken at line 7—7 of FIG. 6 showing the cylinder through which organic peroxide is injected into molten resin.

FIGS. 2, 4, and 6 show different examples of an organic peroxide injection unit including inner cylinder 39. FIGS. 3, 5, and 7 show a cross section of cylinder 39 taken at lines 3—3, 5—5, and 7—7 in the respective units. The example of the organic peroxide injection unit shown in FIGS. 2 and 3 includes an inner cylinder 39 made of a porous sintered metal or a porous sintered ceramic; the example shown in FIGS. 4 and 5 includes a stack of several (six in this example) ring-shaped plates of a metal or a plastic with a slight space interposed therebetween; and the example shown in FIGS. 6 and 7 includes a large member (twenty-four in this example) of rectangular plates arranged in a radial manner so that their lengthwise directions coincide with the flow direction of the resin. The organic peroxide is injected into the resin through a large number of small holes in inner cylinder 39 of FIGS. 2 and 3 and through gaps between plates of inner cylinder 39 shown in FIGS. 4 to 7.

A typical single core cable construction has the following layers from inside to outside: copper conductor; strand shield (semiconductive resin layer); insulating resin layer; metallic shield (copper tape); jute or other similar filler; compound-filled fabric tape; polyvinyl chloride or other resin jacket.

Conventional additives, which can be introduced into the thermoplastic resin compositions, are exemplified by antioxidants, coupling agents, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, flame retardant fillers and additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]methane, bis[(beta-(3,5-ditert-butyl-4-hydroxybenzyl)methylcarboxyethyl)]sulphide, 4,4'-thiobis(2-methyl-6-tertbutylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocirmamate; phosphites and phosphonites such as tris(2,4-di-tert-butylphenyl)phosphite and di-tert-butylphenylphosphorrite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The co-extrudate, which is the product of the process of this invention, can be prepared in various types of extruders provided that they are adapted for co-extrusion. Various extruders are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of about 15:1 to about 30:1. In a wire coating process, after passing through the breaker plate, the extrudate is pumped through a melt flow channel into a crosshead that reorients the polymer flow typically by 90 degrees such that it is directed to uniformly coat the conductor. In a wire coating extrusion process in which multiple material layers are applied to the conductor, the molten polymer from each extruder is independently pumped into a crosshead that is designed to coat the wire or conductor such that the different material layers are distinct, i.e., the material layers are not mixed in the crosshead. The multiple layer crosshead can be designed such that the multiple material layers coat the conductor simultaneously or in a discrete manner. In wire coating applications where the material is crosslinked after extrusion, the die of the crosshead feeds directly into a heating or crosslinking zone.

The advantages of the invention are as follows:

(a) The heating and kneading temperature in the insulating layer extruder is relatively high at 150 to about 170 degrees C., Thus, the viscosity of the molten thermoplastic resin is low and resistance during the passage of the resin through the screen pack is small thereby making possible high productivity. In addition, heating energy is saved and, hence, costs can be reduced.

(b) Since a fine-mesh filter (metal net) can be used as the screen pack, impurities as small as about 50 microns can be removed and, accordingly, a high-quality power cable can be produced.

(c) Since the insulating layer extruder is operated at 150 to about 170 degrees C. in the present invention, excellent dispersion of the antioxidants and other additives is possible, Therefore, a power cable insulating layer without voids can be formed. The effect is that a power cable having a long service life can be obtained.

(d) In the insulating layer, the organic peroxide can be added to the molten resin uniformly at a high temperature of 150 to about 170 degrees C. and diffused at an extremely high speed. This avoids the problem of scorch and no protrusions are generated in the interfaces among the three layers, again, making it possible to obtain a power cable having a long service life.

(e) A metallocene single-site catalyst based resin can be used without sacrifice of productivity according to the present invention. A polyethylene produced using such a metallocene single-site catalyst is found to have excellent electrical and mechanical properties, and, hence, can be used in a power cable on the order of 1,000 kilovolts.

This application is based on Japanese patent application 07124371 filed in Japan on Apr. 25, 1995 (applicant: Nippon Unicar Company Limited; inventor: Youichi Kawasaki) for which priority is claimed.

The patents, patent applications, and publication mentioned in this specification are incorporated by reference herein.

The invention is illustrated by the following examples.

EXAMPLE 1

An example of the production of a power cable using the process of the invention and the three-layer common extruding machine described above follows.

A polyethylene resin composition comprising 100 parts by weight of a high pressure low density homopolymer of ethylene (density: 0.92 gram per cubic centimeter; melt index: 3.2 grams per 10 minutes) and 0.18 part by weight of 4,4'-thiobis(6-tertiary butyl-3-methylphenol) as an antioxidant is prepared as a resin composition for an insulating middle layer.

100 parts by weight of a high pressure ethylene/vinyl acetate copolymer (vinyl acetate content: 28 percent by weight; melt index: 20 grams per 10 minutes) is kneaded with 0.3 part by weight of an antioxidant (tetrakis [methylene(3,5-di-tert-butyl-4-hydroxy hydro cinnamate] methane) and 80 parts by weight of acetylene black at 130 degrees C. for 10 minutes and the resulting mixture is formed into pellets (3 millimeters×3 millimeters). To the pellets are added 0.5 part by weight of an organic peroxide (2,5-dimethyl-2,5-di(tertiary butyl peroxy)hexine). The organic peroxide is soaked into the pellets under agitation at 70 degrees C. for 10 hours so that the pellets are fully impregnated. This is the resin composition for the inner and outer semiconductive layers.

A porous sintered metal inner cylinder 39 having an internal diameter of 10 centimeters, an external diameter of 11 centimeters, and a length of 3 centimeters is embedded in outer cylinder 34 at a location 5 centimeters below the die plate as shown in FIG. 2 to prepare an organic peroxide injection unit.

Thereafter, the above resin composition for an insulating layer is heated and kneaded by the insulating layer extruder and passed into inner cylinder 39 through the die plate at 160 degrees C., and the organic peroxide (dicumyl peroxide) is injected through inner cylinder 39 at a point 5 centimeters below (downstream of) the die plate in an amount of 2 parts by weight based on 100 parts by weight of the insulating layer resin. The 5 centimeters is in close proximity to the die plate and considerably less than one half the distance between the die plate and the die.

Meanwhile, the aforementioned resin compositions for the semiconductive layers are supplied to the inner layer extruder and the outer layer extruder, heated and kneaded at 160 degrees C. and fed to the respective dies.

The inner semiconductive layer, insulating layer, and outer semiconductive layer are extruded around the conductor from the respective dies simultaneously to cover the conductor and are then subjected to a crosslinking reaction in a crosslinking tube heated to 230 degrees C. and located after the dies to obtain a power cable.

When the gelation rate of each part of the insulating layer is measured, it is found to be 80.1=0.3 percent. It is found that an extremely uniform crosslinked polymer is formed. A 500 kilovolt dielectric breakdown test is conducted, but no breakdown occurs. The gelation rate is measured according to Japanese Industrial Standard C-3005.

EXAMPLE 2

Example 1 is repeated except that the organic peroxide is injected 20 centimeters upstream of the die plate of the insulating layer extruder. In this comparative example, it is found that scorch occurs; the gelation rate is 68.2±8.5%; and a uniform crosslinked polymer is not obtained.

I claim:

1. A process for the co-extrusion of an outer layer, a middle layer, and an inner layer, each layer comprising a thermoplastic resin, around a conductive medium in three extruders, one extruder for each layer, connected by a triple crosshead, each of said extruders having an extrusion zone comprising a die plate and, downstream of the die plate, a die, and, downstream of the extrusion zone, a common crosslinking zone, comprising passing the thermoplastic resins through the extrusion zones, under extrusion conditions including an extrusion temperature in the range of at least 150 degrees C. to below the decomposition temperature of the organic peroxide referred to hereinafter, and passing the extrudate into the crosslinking zone, under crosslinking conditions, the improvement comprising introducing an organic peroxide having a half life of one minute at a temperature of about 150 to about 200 degrees C. into the middle layer extruder downstream of the die plate and prior to the point about directly beneath the die plate of the outer layer extruder.

2. A process for the co-extrusion of an outer layer, a middle layer, and an inner layer, each layer comprising a thermoplastic resin, around a conductive medium in three extruders, one extruder for each layer, connected by a triple crosshead, each of said extruders having an extrusion zone comprising a die plate and, downstream of the die plate, a die, and, downstream of the extrusion zone, a common crosslinking zone, comprising passing the thermoplastic resins through the extrusion zones, under extrusion conditions including an extrusion temperature in the range of at least 150 degrees C. to below the decomposition temperature of the organic peroxide referred to hereinafter, and passing the extrudate into the crosslinking zone, under crosslinking conditions, the improvement comprising introducing an organic peroxide having a half life of one minute at a temperature of about 150 to about 200 degrees C. into the middle layer extruder into injection zone 15 of FIG. 1 of the drawing.

3. The process defined in claim 2 wherein the organic peroxide is introduced at a point between the die plate and one half the distance to the die.

4. The process defined in claim 2 wherein the upper limit of extrusion temperature is about 170 degrees C.

5. The process defined in claim 2 wherein the thermoplastic resin is a polyethylene.

6. The process defined in claim 2 wherein each of the thermoplastic resins used in the inner and outer layers are combined with an organic peroxide prior to extrusion.

7. The process defined in claim 2 wherein the organic peroxide is introduced in close proximity to the die plate.

8. The process defined in claim 2 wherein the inner layer is a semiconductive layer; the middle layer is an insulating layer; and the outer layer is a semiconductive layer and/or a jacketing layer.

9. The process defined in claim 2 wherein the organic peroxide is introduced in an amount in the range of about 1 to about 5 parts by weight of organic peroxide per 100 parts by weight of resin.

10. A process for the co-extrusion of an outer semiconductive and/or jacketing layer, an insulating middle layer, and an inner semiconductive layer, the middle layer comprising a polyethylene and the inner and outer layers comprising polyethylene and an organic peroxide, around a conductive medium in three extruders, one extruder for each layer, connected by a triple crosshead, each of said extruders having an extrusion zone comprising a die plate and, downstream of the die plate, a die, and, downstream of the extrusion zone, a common crosslinking zone, comprising passing the polyethylene through the extrusion zones, under extrusion conditions including an extrusion temperature in the range of at least 150 degrees C. to about 170 degrees C., but below the decomposition temperature of the organic peroxide referred to hereinafter, and passing the extrudate into the crosslinking zone, under crosslinking conditions, the improvement comprising introducing an organic peroxide having a half life of one minute at a temperature of about 150 to about 200 degrees C. into the middle layer extruder into injection zone 15 of FIG. 1 of the drawing, but in close proximity to the die plate, said organic peroxide being introduced in an amount in the range of about 1 to about 5 parts by weight of organic peroxide per 100 parts by weight of resin.

* * * * *